United States Patent [19]
Wilner

[11] 3,788,149
[45] Jan. 29, 1974

[54] LOW COST RESISTANCE GAUGE ACCELEROMETER

[75] Inventor: Leslie B. Wilner, Palo Alto, Calif.

[73] Assignee: Becton, Dickinson Electronics Company, Pasadena, Calif.

[22] Filed: June 26, 1972

[21] Appl. No.: 266,410

[52] U.S. Cl. .............................. 73/517 R, 338/46
[51] Int. Cl. ........................................... G01p 15/12
[58] Field of Search...73/88.5 R, 398 AR, 517 R, 73/516 R; 338/43, 46, 277, 2, 6

[56] References Cited
UNITED STATES PATENTS

| | | | |
|---|---|---|---|
| 3,474,526 | 10/1969 | Shoor | 338/2 |
| 3,492,513 | 1/1970 | Hollander, Jr. et al. | 338/2 |
| 3,392,358 | 7/1968 | Collins | 338/2 |

Primary Examiner—James J. Gill

[57] ABSTRACT

A low cost accelerometer is provided for use in mounting on an automobile or other movable object to produce an output signal which will operate an emergency device if the acceleration of the object reaches or exceeds a predetermined unsafe value. The accelerometer employs a strain sensitive element in the form of a thin, and hence fragile, piezoresistive semiconductor element having its respective ends secured to a pair of hinged support members that rotate relative to each other thereby straining the element longitudinally in response to acceleration. An overload release engages the support structure to limit the hinge action to preclude straining the strain sensitive element beyond the breaking point when the accelerometer is subjected to acceleration forces in excess of the normal operating range for which the accelerometer is designed.

27 Claims, 14 Drawing Figures

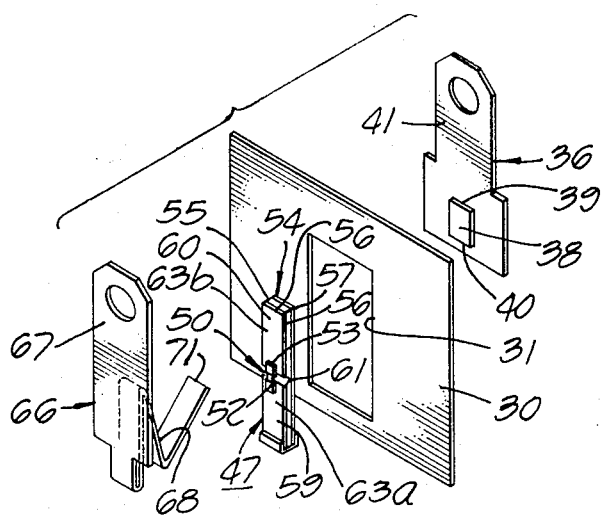

LOW COST RESISTANCE GAUGE ACCELEROMETER

This invention relates to an accelerometer which is adapted to be mounted on an automobile or other object for sensing the acceleration thereof and to actuate an emergency device if the acceleration exceeds a predetermined value, and more particularly to an improved overload release for an electrosensitive strain sensitive element subject to breakage when subjected to forces outside its useful operating range. Though not limited to use to automobiles the invention will be described with particular reference thereto.

There are two principal types of emergency conditions involving the operation of an automobile to which the accelerometer of this invention is applicable. One involves skidding conditions, the other involves crash conditions. The accelerometer of this invention may be employed to operate a utilization device in the form of a relay for actuating a safety device, such as a passenger protective bag under crash conditions. The accelerometer of this invention may also be employed to actuate a servomechanism to aid in the automatic control of brakes under emergency conditions, such as conditions involving skidding of the automobile as sometimes occur on wet streets or in fast turns. Accelerations that occur during the latter types of conditions are normally less than 1G, whereas those that exist under crash conditions are much higher. The accelerometer of this invention is capable of being used effectively in both ranges.

To satisfy this need, this invention provides an accelerometer in which an inertia member is resiliently supported on a base or casing and the relative movement of the casing and the inertia member is sensed by means of a thin piezoresistive semiconductor element having its opposite ends secured to a pair of hinged support members. The electrosensitive strain gauge unit formed by the strain gauge element and the two hingedly connected support members from a strain sensing unit of the type previously described and claimed in U.S. Pat. No. 3,501,732 and the piezoresistive strain gauge element is of the type described there and also described and claimed in U.S. Pat. No. 3,351,880. The strain caused by relative rotation of the support members is concentrated in a short reduced neck that joins a pair of enlarged pads which are fixed to the support members. The two support members are mounted between the base or casing and the inertia member in such a way that when the object on which the accelerometer is mounted is subjected to acceleration, the inertia member moves relative to the base causing the two support members to rotate relative to each other about their joining hinge. The relative movement of these two support members causes the piezoresistive element to be subjected to tension and compression forces. These forces are concentrated in the thin short neck thus producing a large change in resistance, especially if the piezoresistive element is composed of a semiconductor material having a high gauge factor. Such a neck is fragile and may be easily broken if it is elongated or shortened by an excessive amount.

According to this invention, at least one of the support members of the strain gauge element is normally held in place against two pivot means on one of the relatively movable members (casing or inertia member) by means of a relief spring. The force applied by this spring is established at such a value as to permit the piezoresistive element to respond to accelerations up to a predetermined limit. Above that limit, the corresponding support member is lifted from one of the pivot means against the force of the spring to preclude further elongation or shortening of the thin piezoresistive element and is pivoted about the other pivot means. Thus the forces applied across the neck are limited in amount in such a way that breakage of the fragile piezoresistive element is precluded.

The accelerometer of this invention is also provided with overtravel stops which act to arrest the movement of the inertia member within the casing of the accelerometer and thereby prevent further excessive action. Such stops alone may be sufficient to prevent fracture of the strain gauge element when the casing and the inertia member for the accelerometer are made of hard metal since these parts can then be machined to a precision which assures that the overtravel stops will be effective. Such an arrangement is shown in U.S. Pat. No. 3,629,773. However, in order to reduce the cost of manufacturing accelerometers, it is of considerable advantage to form the casing and the inertia member of inexpensively fabricated parts, such as low cost, readily formed plastic moldings whose dimensions are subject to having a wide tolerance. Thus, the present invention provides a supporting arrangement for the strain gauge unit on the plastic parts of such an accelerometer instrument which functions as an overload release that becomes operational to protect the strain gauge element before the overtravel stops on the plastic parts become operational. In this way, the application of excessive forces to the strain gauge element is prevented without relying on those stops for such protection.

Accordingly, one of the objects of the present invention is to provide an accelerometer formed of a fragile piezoresistive element which will not fracture if the accelerometer experiences forces which exceed a predetermined safe value for which it was designed.

Another object of the present invention is to provide an accelerometer which can be used on an automobile to actuate emergency devices when the automobile and the occupants thereof are being exposed to acceleration forces which exceed a predetermined safe value, that is, which lie outside a normal acceleration range.

Another object of the invention is to provide a supporting arrangement for a strain gauge element in an accelerometer which provides for releasing the excess load on the strain gauge element if the applied acceleration force reaches a value which exceeds the normal acceleration range detected by the accelerometer.

Another object of the invention is to provide an improved accelerometer utilizing a strain gauge element formed of piezoresistive semiconductive crystalline material.

Still another object of the invention is to provide an improved accelerometer that may be oil-damped.

Still another object of the invention is to provide an accelerometer which produces an electrical output that is very nearly linear over the range of accelerations of interest, and more particularly, an accelerometer which is linear over a range extending from $-1.0$ G to $+1.0$ G.

Still another object of the invention is to provide an accelerometer for mounting on a vehicle which has low sensitivity in a direction transverse to the selected axis of maximum sensitivity.

And still another object of the invention is to provide an accelerometer for use on an automobile which has a short warm-up time and which has reproducible characteristics which are very nearly constant over a temperature range from about −25°C to +75°C.

And still another object of the invention is to provide an accelerometer which is inexpensive to manufacture, simple to construct, and highly reliable in operation.

These and other objects, features and advantages of the present invention will be understood more fully from the following specification when taken in conjunction with the following drawings wherein:

FIG. 5 is an exploded view of component parts of the accelerometer of FIGS. 1 and 2;

FIG. 6 is a perspective view showing the subassembly of the inertia member and the top member on the leaf srping;

FIGS. 10a, 10b, 10c, and 10d are schematic diagrams of some simple coupling circuits employed to connect the accelerometer to a utilization device; and FIG. 11 is a schematic diagram employed to explain the general principles of operation of the invention.

Figure 1:
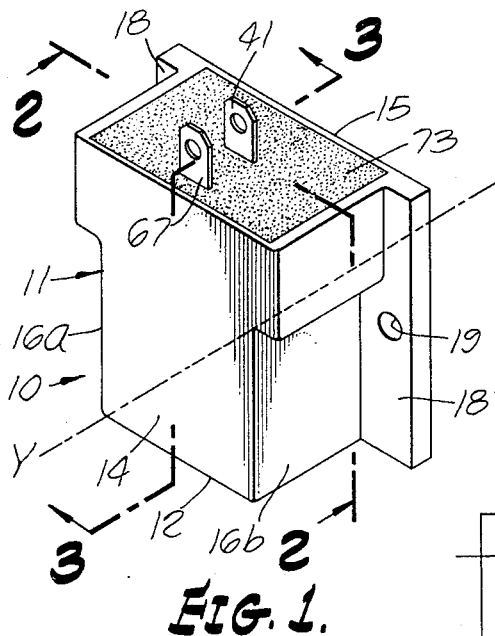
FIG. 1 is a perspective view of an accelerometer embodying the present invention.
Figure 2:
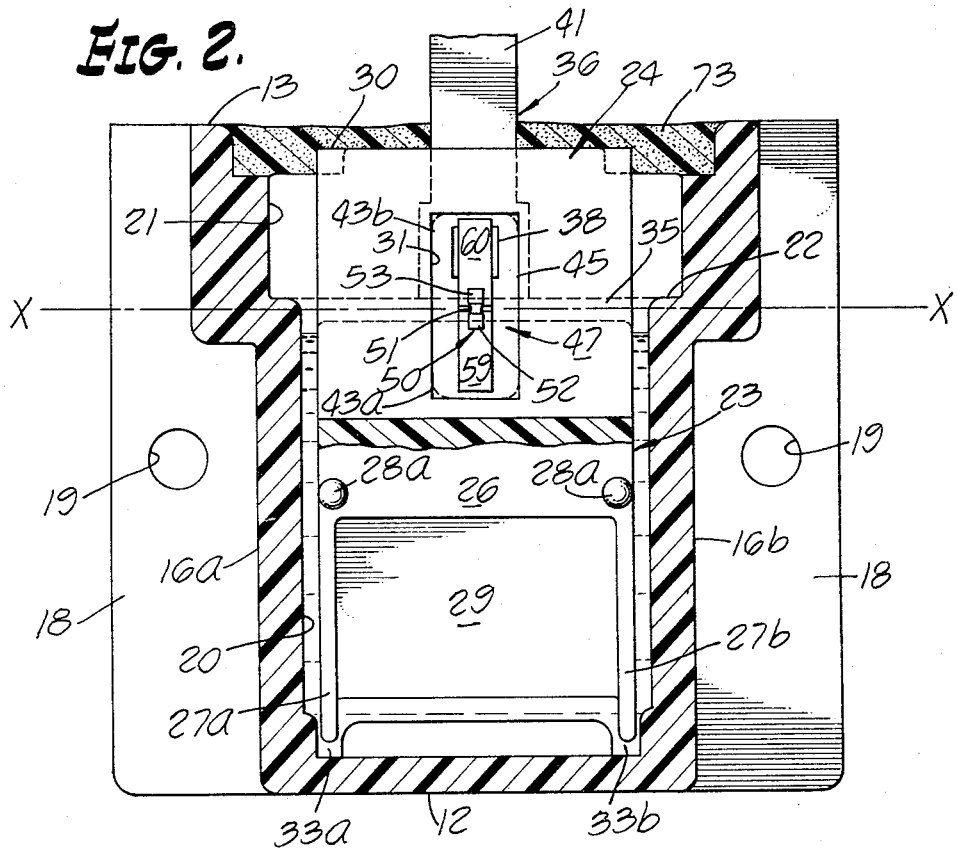
FIG. 2 is a sectional view of the accelerometer as taken along line 2—2 of FIG. 1.
Figure 3:
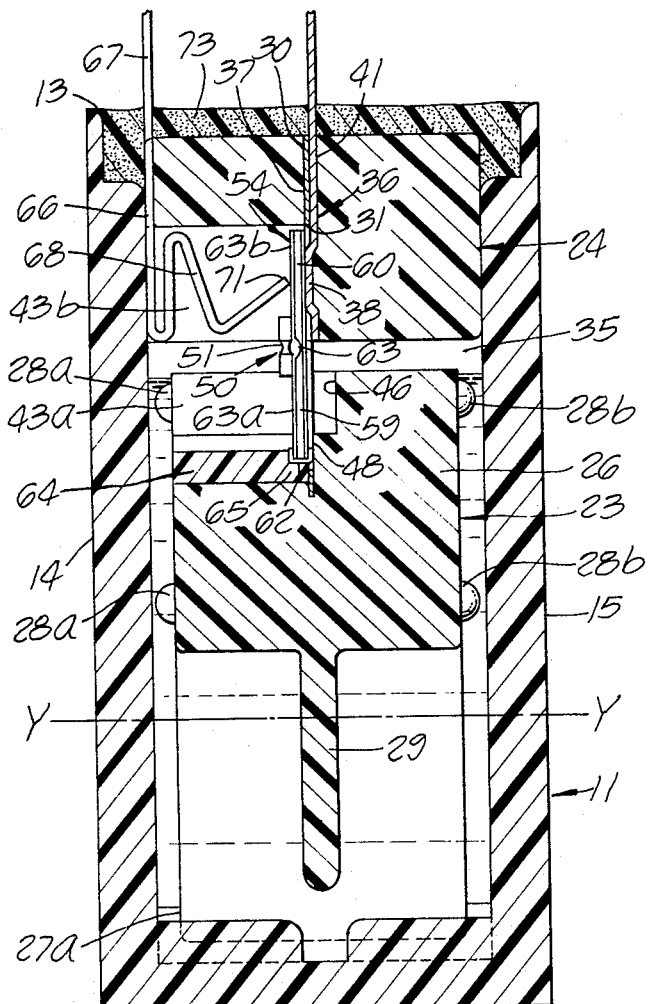
FIG. 3 is a sectional view of the accelerometer as taken along line 3—3 of FIG. 1.

Referring to FIGS. 1, 2, and 3, the accelerometer 10 of the present invention includes a generally T-shaped plastic casing 11 having a bottom 12, a top 13, a front 14, a back 15 and sides 16a and 16b. The back 15 is formed with outwardly extending flanges, or wings, 18 on either side thereof. Each of the flanges 18 is provided with a mounting hole 19 through which a bolt can be passed for anchoring the casing 11 in an upright position to a wall, such as the firewall of an automobile.

As shown in FIG. 2 the casing 11 is formed with a generally rectangularly shaped lower compartment 20 and a rectangularly shaped wider upper compartment 21. The bottom sides of the upper compartment 21 form shoulders 22 on either side of the top of the lower compartment 20. It should be noted that the compartment 20 forms a well which is totally enclosed except for the opening communicating with the upper compartment 21.

The working parts of the accelerometer which are arranged within the case, establish an acceleration axis Y—Y (seen FIG. 3 as well as FIG. 1). The casing 11 is usually mounted with the acceleration axis Y—Y extending from the front to the rear of the vehicle if longitudinal acceleration of the vehicle is to be detected, and from side to side of the vehicle if transverse acceleration is to be detected. Several accelerometers may be mounted on the vehicle to detect acceleration in various directions or in various ranges.

As will be more clearly described hereinafter, the parts of the accelerometer 10 enclosed within the plastic casing 21 include a plastic inertia member 23, a separate plastic top member 24, an electrosensitive unit 47, a leaf spring 30 in the form of an apertured thin resilient metallic sheet, and terminal elements 36 and 66. The inertia member 23 is a molding formed with a solid rectangular body portion 26 provided with depending side walls 27a 27b and having a thin vertically disposed transverse member or paddle 29 located midway of the front and back thereof. The body portion 26 is formed with an end opening 43a on the upper front surface thereof. Bosses 28a and 28b formed on the respective front and back surfaces thereof serve as overtravel stops for the inertia member 23. The top member 24, which is wider than the inertia member 23 has an end opening 43b formed on the lower front surface thereof.

As shown in FIGS. 2 and 3, the plastic inertia member 23 and the top member 24 are joined together, at the time they are molded, by the apertured flat leaf spring 30. The sheet from which the leaf spring 30 is formed is as wide as the inertia member 23 and is provided with a relatively large, rectangular opening or aperture 31 located centrally of the sides thereof. Thus, the lower portion of the sheet forming leaf spring 30 is embedded in the solid body portion 26 of the inertia member 23 midway of the front and back parts thereof, and the upper portion of the sheet forming the leaf spring 30 is embedded in the solid top member 24 midway of the front and back thereof. When the members 23 and 24 are so joined the top of the inertia member 23 is spaced by a relatively wide gap 35 from the bottom of the top member 24. The leaf spring 30 provides a Cardan hinge 25 permitting pivotable movement of the inertia member 23 about the axis X—X (see FIG. 2) with respect to the base 24, which is formed by the top member. The term "base," used in this sense, refers to part of an accelerometer which is secured, in this instance, by means of the casing 11, to the object which is subjected to acceleration.

As shown in FIGS. 2 and 3, terminal element 36 is positioned on the back of the sheet forming leaf spring 30 and embedded along with the sheet within the plastic top member 24 at the time the latter is being molded. The lower portion of the terminal element 36 is coined from the back surface thereof to form a rectangularly shaped flat projection 38 which has one relatively sharp corner on its upper horizontal edge 39 and another on its lower horizontal edge 40. The projection 38 on the lower portion of terminal element 36 is disposed within the opening 31 of the leaf spring 30 and the upper portion 41 of the terminal element 36 extending beyond the top 13 of the casing 11 provides one of the electrical connectors for the accelerometer 10. The vertical plane of the external surface 32 of the projection 38 is offset only a small distance such as about 0.005 inch from the adjacent surface 33 of the terminal member 36. This plane 32 is nearly coplanar with the front surface 37 of the leaf spring. The axis of Cardan hinge 25 is made coincident with the axis of hinge 63 of the electrosensitive element.

When the inertia member 23 and the top member 24 are assembled together with the leaf spring 30 at the time they are molded from a thermosetting plastic, their respective end openings 43a and 43b are aligned to form an elongated vertical slot 45 that extends inwardly to the center of the members 23 and 24 thus exposing the rectangular opening 31 of the leaf spring 30, and the coined flat projection 38 on the front surface of the exposed portion of the terminal element 36. It should be noted that the bottom of opening 43a in the inertia member 23 is further provided with an undercut 46 so that only a portion 48 of the bottom lies in the plane of the rectangular opening 31 in the leaf spring 30.

The electrosensitive unit 47 includes a piezoresistive element 50 in the form of a very small, thin, elongated block of semiconductive material having a reduced neck 51 separating two enlarged flat mounting pads 52 and 53 forming a body of hourglass configuration. It should be particularly noted that the element 50 is made of a minute crystalline structure that is relatively fragile. Furthermore, the reduced neck 51 has the properties of an Euler column when viewed in terms of forces applied to the element along its axis. In a practical embodiment, a piezoresistive element 50 of this type is formed of a very small elongated block of piezoresistive material such as one having a thickness of 0.005 inch, a width of 0.024 inch, and a length of 0.075 inch. The reduced neck 51 has a thickness of about 0.007 inch at the thinnest point of its width and a thickness in the other direction of about 0.001 inch. With this arrangement, substantially all the strain is applied across the short thin neck 51 of the piezoresistive element 50. A piezoresistive element of this type has been more fully described and claimed in U.S. Pat. No. 3,351,880, while the electrosensitive unit, as a whole, has been more particularly described and claimed in U.S. Pat. No. 3,501,732.

A supporting member 54 for the electrosensitive unit 57 is formed of an elongated central body or substrate 55 composed of insulating material sandwiched between two coatings or sheets 56 and 57 of a conductive material such as copper. The insulating material forming the substrate 55 or intermediate layer of the laminate is preferably an epoxy bond made with a fiber glass base. Such laminates are commonly used for printed circuits in the electronic field. In a practical embodiment a supporting member 54 of this type has a length of 0.4 inch, a width of 0.06 inch and a thickness of 0.02 inch, and the copper sheets 56 and 57 have a thickness in the range of 0.0005 inch to 0.003 inch. The supporting member 54 has a deep groove 61 on its front surface cut crosswise midway of its length which divides the upper sheet 56 of conductive material into two segments 63a and 63b. The pads 52 and 53 are ohmically bonded by solder, to the respective metal segments 63a and 63b on opposite sides of the transverse groove 61.

In this way the electrosensitive unit 47 is provided with two relatively pivotable support arms 59 and 60 connected by hinge 63 formed by the transverse groove 61 thereby permitting relative rotation of the two arms 59 and 60 about the hinge 63. Since the piezosisitive element 50 is bonded securely to these two pivotable arms 59 and 60, it is subjected to tension and compression during such rotation, resulting in expansion and contraction of the neck thereby changing the electrical resistance of the piezoresistive element 50 in accordance with the relative rotation.

An electrical jumper 62 in the form of a metallic coating on one end of the supporting member 54 connects the metal segment 63a to the metallic sheet 57 on the opoisite side of the laminate. The conductive segment 63b on the end of the supporting member 54 removed from the jumpered end thereof forms a first electrical electrode of the electrosensitive unit 47 and the metallic sheet 57 on the opposite side of the substrate 55 forms a second electrical electrode of the electrosensitive unit 47. The two electrodes are thus electrically connected to opposite ends of the piezoresistive element 50.

The electrosensitive unit 47 is positioned in the bottom of the slot 45 formed by the aligned openings 43a and 43b in the respective inertia member 23 and the top member 24 so that the upper arm 60 of the supporting member 54 is positioned with its flat sheet 57 contacting the flat surface 34 of the rectangular projection 38 formed on the terminal element 36. The jumpered end 62 of arm 59 is firmly anchored in position on the inertia member 23 by a clamping member 64 the sides of which are slid down into opposing side slots 49 formed on the bottom of the end opening 43a on the inertia member 23 (see FIGS. 3, 4 and 7). The inner end of the clamping member 64 is provided with a narrow projection to provide a footing and step for supporting the lower end of the electrosensitive unit 54 and for pressing it against the portion 48 of the inertia member 23. The clamping member 64 is secured in position by a slightly flexible cement.

Terminal element 66 which is formed of a resilient conductive material is positioned with its straight portion 67 located in a recess 69 provided on the front surface of the top member 24. The central portion of element 66 which extends into the end opening 43b on the top member 24 is angularly bent for forming a relief spring 68, the inner pointed end 71 of which is biased to exert on the top of the arm 60 a clamping force which maintains the flat underlying surface of the arm 60 frictionally engaged flat against the flat surface of the projection 38 only over an anticipated normal acceleration range.

The outer end 41 of the terminal element 36 extends beyond the top 13 of the casing 11 thereby forming an electrical terminal 41 of the accelerometer. The outer end of straight portion 67 extends beyond the top 13 of the casing 11 forming the other electrical terminal 67 of the accelerometer 10.

It is to be noted that the two electrical terminals 41 and 67 are in electrical communication with the two pads 53 and 52 respectively of the piezoresistive element, the connections being made through the copper coatings 56 and 57.

The assembly above described, shown in FIG. 6, is positioned within the casing 11 with the inertia member 23 pendulously suspended in the well formed by the lower compartment 20 as a result of the extended sides of the top member 24 resting on the shoulders 22 formed on the opposite sides of the top of lower compartment 20. The bottom edge portion of the depending side walls 27a and 27b extend down into recesses 33a and 33b formed along either of the bottom sides of the lower compartment 20. This assembly is then securely held in position in the casing 11 by a potting compound 73 which fills the space on the upper end of the upper compartment 21 above the top member 24.

It should be noted that the inertia member 23 is dimensioned to provide a spacing from the side walls and the front and back walls of the lower compartment 20 so that the inertia member 23 is free to swing within the casing 11 when rotated about the hinge 63 formed by the leaf spring 30 in response to horizontal acceleration forces. The bosses 28a and 28b on the respective front and back surfaces of the body portion 26 of the inertia member 23 are sufficiently spaced from the back and front inside surfaces of compartment 20 to permit the inertia member 23 to move to provide a strain on the piezoresistive element 50 which is within the anticipated normal range of acceleration being measured by the accelerometer 10.

Mechanical damping is provided for the accelerometer 10 by placing silicone oil in the well formed by the lower compartment 20 of casing 11. The top level of the oil lies beneath the uppermost edge of the inertia member 23 thus leaving an air space about the body of the oil to accommodate contraction and expansion of the oil due to temperature changes. When the acceleration changes, oil on one side of the inertia member 23 is raised slightly while that on the other side is lowered slightly and oil also is squeezed through other passages. Thus, as the accelerometer tends to vibrate as a result of any shock it experiences, the oil on one side of the transverse vertical member 29 is effectively squeezed past the clearances provided on the lower edge of the transverse vertical member 29 and the lower edge portions of the vertical sides 27a and 27b to the other side of the transverse vertical member 29. However, the greatest resistance to vibratory motion occurs where the movement of the inertia member 23 is the greatest, namely, at the lowermost end thereof.

It should be especially noted that the leaf spring 30 in the form of the resilient, thin, rectangular sheet fully supports the suspended inertia member 23 so that the end 71 of the bent relief spring portion 68 of the terminal element 66 is only required to clamp the arm 60 against the front flat surface 38a of projection 38 in response to strains transmitted to the neck 51 as a result of accelerations within the normal range of accelerations. Furthermore, by providing the centrally located rectangular opening 31 in the leaf spring 30, the projection 38 can be placed in the same plane as the leaf spring 30.

Still further by making the leaf spring 30 in the form of a resilient, flat, thin sheet which is as wide as the inertia member 23, the accelerometer is made compliant only about the axis of rotation X—X of the electrosensitive unit 47 but is very stiff against other motions, including motion about the neutral axis, that is, the axis Y—Y parallel to the direction in which the acceleration force is applied and also including non-rotational translation of inertial member 26 which would tend to shear the leaf spring in the gap 35.

It should now be clearly understood that when the inertia member 23 is rotated about the axis of rotation X—X the strain gauge unit 47 also rotates about the axis 63 provided by transverse groove 61 on supporting member 51. Resultant movement between the forward ends of the transverse groove 61 causes the piezoresistive element 50 mounted on the opposite edge of this groove 61 to be subjected to strain by either expansion or contraction. Thus, the piezoresistive element 50 is elongated and shortened, contracting and expanding in cross-section as the arms 59 and 60 of the electrosensitive unit 47 are moved relative to each other as the inertia member 23 swings about a horizontal transverse axis X—X (see FIG. 2) in response to acceleration along the horizontal longitudinal axis Y—Y (see FIG. 3). As the piezoresistive element 50 expands and contracts, the resistance of the path through its neck 51 decreases or increases respectively so that an electric current flowing through the piezoresistive element 50 varies in a manner corresponding to the acceleration force on the inertia member 23.

For the anticipated normal acceleration range of operation of accelerometer 10 the spring force arrangement provided by the bent relief spring 68 portion of element 66 maintains the face of the arm 60 of supporting member 54 frictionally engaged flat against the face of projection 38. For this reason, in operation of the accelerometer 10, whenever the inertia member 23 experiences a force within an anticipated normal range of operation of the accelerometer 10 the inertia member 23 rotates in one direction or the other depending upon the direction of the applied force about the axis X—X by an amount proportional to the acceleration. This rotation about the hinge 63 results in either expansion or contraction on the piezoresistive element 50 which causes the resistance of the electrical path between the electrical terminals 41 and 67 of the accelerometer to vary in accordance therewith. In practice, the change of resistance is nearly proportional to the acceleration.

Figure 4:
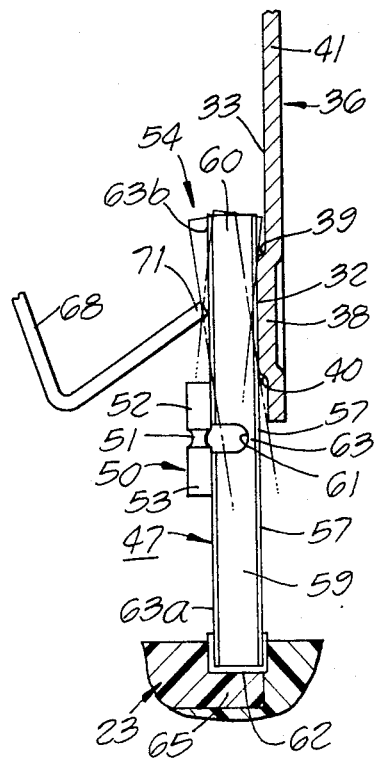
FIG. 4 is an enlarged view employed to explain the action of the overload relief device in preventing the piezoresistive element from fracturing when the accelerometer is subjected to forces beyond its normal range of operation.

If, however, the acceleration force on the inertia member 23 exceeds the normal acceleration range of operation of the accelerometer the supporting structure for the arm 60 provides for relieving the overload on the piezoresistive element 50 so as to prevent it from fracturing. Thus, as illustrated in FIG. 4, if the moment of a backwardly directed excessive acceleration force applied on the inertia member 23 about the lower edge 40 of projection 38 is greater than the moment of the force exerted by the end 71 of the bent relief spring 68 in the opposite direction about the lower edge 40, the arm 60 of the supporting member 54 tilts about the lower edge 40 so as to relieve the strain being transmitted to the neck 51 of the piezoresistive element 50. On the other hand, if the moment of a forwardly directed excessive acceleration force applied on the inertia member 23 about the upper edge 39 of projection 38 is greater than the moment of the force exerted by end 71 of the bent relief spring 68 in the opposite direction about the upper edge 39, the arm 60 of the supporting member 54 tilts about the upper edge 39 so as to relieve the strain being transmitted to the neck 51 of the piezoresistive element 50.

Since it is only the upper and lower edges of the projection 38 that act as pivot axes for the support member 60 in the overload region, these two edges constitute, in effect, a pair of parallel frets or fulcrums against which the spring 68 presses the support member 60 during acceleration in the normal acceleration range. The spring 68 presses the upper support arm 60 against both of these frets while the acceleration has a low value in the normal acceleration range but presses the support member 60 against only one of these frets when the accelerations lie outside that range.

The length of the spring 68 in a horizontal direction between the support member and the rear wall 14 of the casing, is large compared with the deflection to which the upper support member 60 is subjected. As a result, the force applied by the spring 68 to that upper support member is relatively constant either during excessive acceleration or excessive deceleration. As a result, the stress applied to the piezoresistive element is nearly constant when the acceleration or deceleration lies outside the predetermined range determined by the strength of the spring and the location of the frets relative to the hinge 61 of the support member.

It should now be clearly understood that as long as the forces applied on the electrosensitive unit 47 are within what is considered to be the normal range of operation of the piezoresistive element 50 the flat underlying surface of the arm 60 of supporting member 54 is held firmly against the flat surface of projection 38 by the clamping force exerted by end 71 of the bent relief spring 68 so that the force experienced by inertia member 23 is applied to strain the piezoresistive element 50. However, when the applied acceleration force reaches a magnitude which exceeds the normal range of operation, the arm 60 of the supporting member 54 tilts about either the lower edge or fret 40 or the upper edge or fret 39 of the projection 38 thus permitting the arms 59 and 60 to rotate together until the bosses 28a or 28b on the front or back surface of the inertia member 23 contact the inner surface of the casing 11. The tilting of the arm 60 relative to the surface of the projection 38 in this manner thus lifts the arm 60 from one of the edges, or frets, and thereby relieves the overload on the piezoresistive element 50 and prevents it from fracturing. And the bosses further protect the entire instrument at higher values of accelerations.

Figure 8:
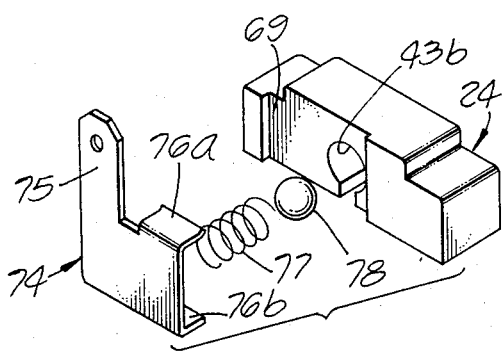
FIG. 8 is an exploded view of the parts of the spring arrangement for holding the supporting member in FIG. 7.
Figure 7:
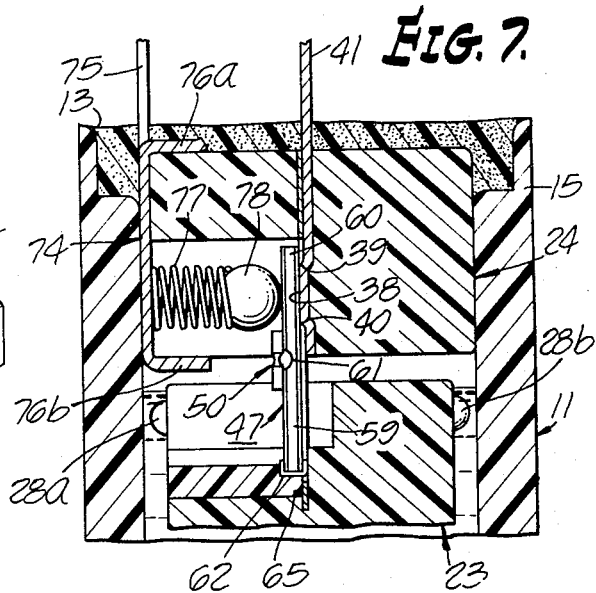
FIG. 7 is a partial, vertical, sectional view similar to that of FIG. 3 showing another spring arrangement for holding the supporting member of the electrosensitive unit in acceleration-responsive condition in the accelerometer.

A similar accelerometer 10 employing another spring holding arrangement for clamping arm 60 of the supporting member 54 to the flat projection 38 anchored to the object whose acceleration is being measured is illustrated in FIGS. 7 and 8. Thus, a terminal element 74 is provided with a straight portion 75 which is positioned in recess 69 provided on the front surface of top member 24. The straight portion 75 has formed thereon bent tabs 76a and 76b which respectively grip the top and bottom of the top member 24 and thus hold the terminal element 74 in position. The outer end of the straight portion 75 extending beyond the top 13 of the casing 11 forms one of the electrical connectors for the accelerometer. A helical spring 77 located in end opening 43b in the top member 24 is held by the back surface of terminal element 74 so as to exert a force on a steel ball 78 which contacts the center of the arm 60. The force of the spring 77 is of such a magnitude as to clamp the arm 60 in position on the flat surface of projection 38 over a normal range of strain applied to the piezoresistive element 50 by the acceleration force applied to the inertia member 23. However, if the acceleration force produces a strain which exceeds the normal range of strain, the arm 60 is tilted about either the upper edge 39 or lower edge 40 of projection 38 so as to relieve the overload on the piezoresistive element 50.

It should now be clearly understood that in accordance with the invention the fracture difficulties that would otherwise be encountered with the crystalline piezoresistive element 50 are precluded by the use of a suitable spring force holding the arm 60 of the supporting member 54 against the projection 38 affixed to the casing 11 throughout the normal range of strain supplied to the piezoresistive element 50 while permitting the arms 59 and 60 of supporting member 54 to tilt as a unit about either edge 39 or edge 40 of the projection 38 when predetermined excessive strains are applied.

It is to be noted that the accelerometer comprises two main relatively movable parts, namely, the base or casing and the inertia member, connected by a main Cardan hinge. It also comprises two subsidiary relatively movable parts, namely, the two support members connected by a second Cardan hinge. A short thin piezoresistive semiconductor element is rigidly secured to the two subsidiary relatively movable members. The lower support member is firmly held in place on the inertia member. A relief spring presses the other support member into engagement with fulcrum members on the other main relatively movable member. And externally projecting electrical terminals are connected to the ends of the piezoresistive elements that are secured to the two support members. Oil provides viscous damping of the vibration of the inertia member relative to the cases.

In the particular accelerometer described herein, the casing is of rectangular-like configuration, having a height of about 1¾ inch, a thickness along the Y—Y axis of about three-fourths inch and an overall width in the direction of the transverse axis X—X of about 1¾ inch. The sizes and the spacings of the various parts are shown in their approximate proportions in FIGS. 2 and 3. The weight of the entire unit is approximately 45 grams. The viscosity of the oil is so chosen in accordance with methods well-knowon in the art to establish the damping ratio at about $0.45 \pm 0.15$ of the critical damping, a term that is well-known in the vibration art. An oil is chosen that has a low temperature coefficient of viscosity.

The electrical resistance of the particular piezoresistive element is generally set between 300 and 1,600 ohms at 20°C to meet the needs of the particular application in which the accelerometer is to be employed.

The change in resistance is nearly proportional to acceleration, being linear within about 5–10 percent over a range of $-1.0$ G to about 1.0 G. The resonant frequency of a particular unit that has been tested, was slightly below 10 Hz and the frequency response was uniform to $\pm 5$ percent at frequencies below 10 Hz.

Such an accelerometer is suitable for detecting changes in acceleration and hence braking force and hence for providing an electric signal which may be employed in control of the acceleration or braking force. Such an accelerometer may also be employed to detect accelerations that exceed a predetermined limit and hence is suitable for applying an electrical signal to operate a safety device under such conditions.

Figure 9:
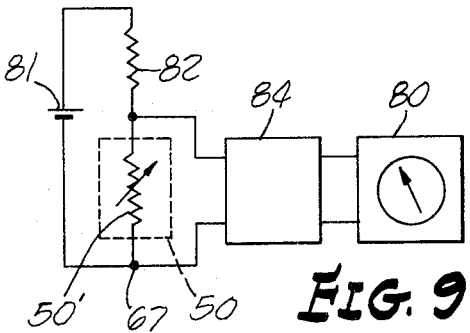
FIG. 9 is a schematic diagram of the electric circuit of the accelerometer connected to control a utilization device.

In FIG. 9 a schematic electrical circuit diagram shows the accelerometer 10 connected to a utilization device 80 through a coupling circuit 84. One side of a power supply 81 is connected by a fixed resistor 82 to one electrical terminal 41 and the other side of the DC power supply 81 is connected to the other electrical connector 67 of the accelerometer 10. The variable resistance of the piezoresistive element 50 is schematically represented as a variable resistor 50' in FIG. 9. The voltage appearing across the piezoresistive element 50 is applied to the input of the coupling circuit and the output of the coupling circuit is applied to the utilization circuit 80. The coupling network 84 may take many forms& such as those shown in FIGS& 10a, 10b, 10c, and 10d.

Figures 10A, 10B, 10C, 10D:
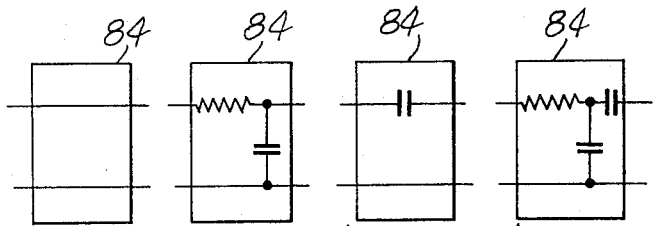

If the coupling circuit 84 merely consists of two wires as shown in FIG. 10a, that connect a voltmeter 80 directly across the piezoresistive element 50, the voltmeter may be calibrated directly to read the acceleration. For some limited special purposes, such a voltmeter may be mounted on the dashboard of the automobile to display the value of the acceleration to the operator or other occupant of the automobile.

The coupling circuit 84 may also be in the form of a differentiating network as shown in FIG. 10b. In this case, the output signal appearing across the differentiating network represents the rate of change of acceleration. Such a signal may be employed to operate a servomechanism that regulates the acceleration or braking action.

In some applications, it is desirable to produce a signal at the input of the coupling network that is nearly independent of temperature. This may be accomplished either by employing a resistor 82 that has the same temperature coefficient of resistance as the piezoresistive element, or by employing a blocking capacitor in the coupling circuit 84 as shown in FIG. 10b or 10d.

It will also be understood that the power supply 81 may be in the form of an AC power supply and that suitable coupling circuits 84 and utilization device 80 may be provided to produce signals proportional to acceleration or to change of acceleration as may be needed in the particular application.

A relay that actuates an inflatable bag or an emergency brake under emergency conditions can be actuated when either the acceleration or the rate of change of acceleration exceeds a predetermined limit. It will be understood that the value of acceleration at which such actuation occurs may be established in many different ways, such as by adjusting the strength of the leaf spring 30 or the means of the inertia member without changing the strain gauge unit 47 or the relief spring arrangement.

While the invention has been particularly described with reference to its use in solving particular problems arising in the operation of automobiles, it may be employed in many other ways. For example, the accelerometer may be employed as a seismometer in the study of strong vibrations, such as vibrations of buildings and other structures. Use for all such purposes become possible because of the low cost of the device coupled with its rugged construction and reliability. Indeed, the invention may be employed for measuring other types of phenomena which produce a force that is applied to the electrosensitive unit 47. A schematic diagram of the general arrangement is shown in FIG. 11 to assist in understanding the broad principles of construction and operation.

In such a unit 47 a piezoresistive or other electrosensitive element 50 is mounted on a support member 54 having a two supports 59 and 60 connected by a hinge 63 at the mid-section of the support arm as previously described. The support arm 60 engages a pair of lineal fulcrums or pivots 39 and 40. Spring means 87 press against the arm 60 urging this arm into engagement with both pivots 39 and 40. The spring 87 in this case has a flattened conical tip 88 where it engages the constrained arm.

Suitable means such as a rod 90 applies the force to be measured to the support arm 59 on the opposite side of the midsection from the pivots 39 and 40, thus providing a measure of the phenomenon that produces the force. The rod 90 may be pivotally connected to the free arm 59 or it may be pressed against one side of the free arm. In the former case, forces in opposite directions may be measured. In the latter case, only forces in one direction may be measured.

In operation, when the rod 90 applies a force to the free support arm 59, a moment is created which causes the two support arms 59 and 60 to rotate relative to each other about an axis at the Cardan hinge 63. So long as the moment in question lies within the normal range, the resistance of the electrosensitive element 50 varies in accordance with the magnitude of force but such a moment stresses the electrosensitive element 50. When the rod 90 applies a force to the free arm in excess of a predetermined limit, the constrained arm 60 is lifted off one of the pivots, thereby relieving and limiting the force applied to the piezoresistive element 50. The predetermined limit is defined in part by the strength of the spring and in part by the spacing of the rod 90 and the pivots 39 and 40. It is to be noted that if it is only necessary to protect the electrosensitive element against excessive force applied in one particular direction to the free support arm, the pivot from which the spring-engaged support arm is lifted need not be lineal and parallel to the other pivot, but may be of some other form. Of course, either lineal pivot may be in the form of two pivot elements to establish the fulcrum about which the electrosensitive element pivots.

While the accelerometer shown and described herein is admirably adapted to fulfill the objects and advantages previsouly mentioned as desirable, it is to be understood that the invention is not limited to the specific features shown and described but that the means and configuration herein disclosed are susceptible of modification in form, materials, proportion and arrangement of parts without departing from the principles involved or sacrificing any of its advantages and the invention, therefore, may be embodied in various forms within the scope of the appended claims.

The invention claimed is:

1. In an accelerometer:
   an acceleration responsive device comprising a pair of mechanical members resiliently connected together, one of said mechanical members being a base member that is adapted for attachment to an object whose acceleration is to be detected, the other mechanical member being an inertia member which resists motion communicated to it by the base member through the resilient connection therebetween;
   a strain gauge unit having a thin piezoresistive strain detecting element having its ends respectively bonded to each of a pair of enlarged support elements separated by a gap and having a hinge interconnecting said support elements, whereby the thickness of said gap is altered by relative pivotal movement of said support elements;
   means for connecting said support elements to said mechanical members, said connecting means comprising a pair of fulcrum means and a spring for urging one of said support elements and one of said mechanical members into engagement through said fulcrum means, whereby said support elements flex about their interconnecting hinge to stress said piezoresistive element when said two mechanical members move relative to each other in response to acceleration of said base member, both said fulcrum means remaining engaged by pressure of said spring while the magnitude of acceleration lies in one range and one fulcrum means becoming disengaged and the other fulcrum means remaining engaged and acting as a pivot between said one mechanical member and said one support member when the acceleration lies in a range outside of said first mentioned range; and a pair of electrical terminals connected to said piezoresistive element to detect changes in resistance thereof resulting from acceleration applied to said base member.

2. An accelerometer as defined in claim 1 wherein said piezoresistive element is composed of semiconductor material.

3. An accelerometer as defined in claim 1 wherein said intermediate portion of said piezoresistive element is a semiconductor element that has a reduced cross sectional area in the part thereof that extends across said gap.

4. An accelerometer as defined in claim 1 wherein said one mechanical member comprises a casing that includes said base member and encloses said other mechanical member, said strain gauge unit and said attaching means.

5. An accelerometer as defined in claim 1 comprising a leaf spring interconnecting said two mechanical members and acting as said resilient connection and defining a rotation axis therebetween, said rotation axis being substantially parallel to the axis about which said support elements flex.

6. An accelerometer as defined in claim 5 wherein said two axes are substantially coaxial.

7. An accelerometer as defined in claim 1 wherein said fulcrum means are provided by projecting means secured to said face member and one end of said spring is connected to said base member and the other end of said spring engages said one support element at a point located between said pair of fulcrum means.

8. An accelerometer as defined in claim 7 wherein said other support element is rigidly secured to said inertia member.

9. An accelerometer as defined in claim 4 in which said two mechanical members and said casing are composed of a plastic material.

10. An accelerometer as defined in claim 9 comprising overload stops arranged between said casing and said inertia member for limiting the movement of said inertia member relative to said case when the acceleration attains a predetermined value in excess of that which produces the lifting action referred to in claim 1.

11. An accelerometer including
a casing adapted for mounting on a body whose acceleration is to be sensed,
a leaf spring,
an inertia member suspended within said casing by said leaf spring,
an elongated supporting member formed of insulating material having a transverse groove formed in one surface midway of the length thereof to form a pair of interconnected arm portions, said supporting member having conductive coatings on each of said arm portions, a conductive coating on the opposite surface of said supporting member, and a conductive jumper electrically connecting the conductive coating on one of the arm portions with the conductive coating on the opposite surface thereof, the jumpered arm portion of said supporting member being affixed to said inertia member, a piezoresistive element having two end portions and an intermediate portion, said piezoresistive element mounted on said one surface of the supporting member to bridge said transverse groove by having its end portions bonded to the conductive coatings on the respective arm portions, a first conductive terminal element affixed to said casing and having a pair of projecting frets, and a second conductive terminal element affixed to said casing and including spring force means for holding the unjumpered arm portion of the supporting member against said frets, whereby when the acceleration force on said inertia member is within a predetermined normal range of operation said unjumpered arm portion is held by said spring force means against said frets to thereby transmit the strain produced by the relative movements of the arm portions across the piezoresistive element, and whereby when the acceleration force on said inertia member is in excess of the predetermined normal range of operation said unjumpered arm portion is tilted relative to said frets to thereby relieve the strain being transmitted across the piezoresistive element.

12. The invention in accordance with claim 11 wherein said intermediate portion of said piezorisisitve element is a semiconductor element and has a smaller cross sectional area than either of said end portions.

13. The invention in accordance with claim 12 wherein said leaf spring is a relatively large, thin rectangular sheet of resilient material having a centrally located opening, and wherein the frets on said first conductive terminal element are disposed in said centrally located opening.

14. The invention in accordance with claim 13 wherein said first conductive terminal element has an outer end portion forming one of two electrical terminals for the accelerometer and wherein said second conductive terminal element has an outer end portion forming the other electrical terminal for the accelerometer.

15. The invention in accordance with claim 11 wherein said casing and said inertia member are each molded of plastic.

16. The invention in accordance with claim 11 wherein at least the lower portion of said casing is filled with oil and said inertia member is formed with a depending member whose movements through said oil provides for damping said inertia member when the accelerometer is subject to vibration.

17. The invention in accordance with claim 14 wherein a utilization device is coupled to the two electrical terminals of said accelerometer.

18. The invention in accordance with claim 11 wherein said spring force means comprises a portion of said second conductive terminal forming an angularly bent relief spring having an inner end contacting and holding the unjumpered arm portion of the supporting member against said frets on said first conductive terminal element.

19. The invention in accordance with claim 11 wherein said spring force means comprises a helical spring which is mounted in said casing, and an electrically conductive ball on the end of said helical spring which contacts and holds said unjumpered arm portion against the frets on said first conductive terminal element.

20. The invention in accordance with claim 14 wherein said plastic inertia member is provided with bosses on the front and back surface thereof for arresting the movement of said inertia member within said plastic casing when said unjumpered arm portion is tilted about said one of said frets.

21. An accelerometer comprising a plastic casing adapted for mounting on a body whose acceleration is to be sensed, a leaf spring in the form of a wide thin metallic resilient sheet having an opening in the center thereof, a plastic inertia member affixed to one end portion of said leaf spring and suspended within said casing by affixing the other end portion of said leaf spring to said casing, an elongated supporting member having a transverse groove on one surface thereof midway of the length thereof to form opposite arm portions, a thin and fragile crystalline strain gauge element having two opposite end portions and an intermediate portion the electrical resistance of which varies in a predetermined manner in response to strains transmitted by the end portions thereof, said crystalline element being mounted on one surface of said supporting member so as to bridge said transverse groove by having the inner side of its two end portions respectively bonded to the two arm portions of said supporting member for transmitting strains produced by the relative rotation of said arm portions about said transverse groove to said end portions, said inertia member being affixed to the end of one of said two remote arm portions of said supporting member, a first terminal element affixed to said casing and provided with a portion having a flat projection surface, a relief spring the inner end of which exerts a force on the outer side of the other of the two remote arm portions for holding said other remote arm portion flat against said flat projection surface over a predetermined normal strain range applied to said crystalline element and permitting said other remote arm portion to be tilted relative to said flat projection surface in response to predetermined applied strains exceeding said normal strain range, and a second terminal element affixed to said casing, said terminal elements being electrically connected to the respective end portions of said crystalline element.

22. An accelerometer including a casing having a bottom compartment, said casing adapted to be mounted in an upright position on a body whose acceleration along a horizontal path is to be sensed, a leaf spring, an inertia member suspended within the bottom compartment of said casing by said leaf spring, an elongated supporting member having a transverse groove on one surface thereof midway of the ends thereof to form opposite arm portions, a small fragile piezoresistive element mounted across the transverse groove on said supporting member, said piezoresistive element having a neck portion the electrical resistance of which varies in a predetermined manner in response to the strains transmitted thereto by the relative rotation of said arm portions about said transverse groove, means for anchoring one arm portion of said supporting member to said inertia member, a first terminal element secured to said casing, said first terminal element provided with a flat projection portion having upper and lower edges, and a second terminal element secured to said casing, said second terminal element having a spring force portion for contacting the other arm portion of said supporting member and holding said other arm portion against the flat projection portion of said first terminal element, whereby when the moment of the acceleration force on said inertia member in one direction is less than the moment of the force produced by the spring force portion in the opposite direction with respect to either the upper or lower edge of said flat projection portion, said other arm portion is held by said spring force portion against said flat projection portion to thereby transmit the strain produced by the relative movements of the arm portions across the piezoresistive element, and whereby when the moment of the acceleration force on said inertia member in one direction is greater than the moment of the force produced by the spring force portion in the opposite direction with respect to either the upper or lower edge of the flat projection portion, said other arm portion is tilted about either the upper or lower edge of said flat projection portion to thereby relieve the transmission of any further strain across the piezoresistive element.

23. In an accelerometer an inertia member, a leaf spring having one end thereof affixed to a body whose acceleration is to be sensed and the other end thereof affixed to said inertia member, an elongated supporting member having a transverse groove on one surface thereof midway of the length thereof to form opposite arm portions, a strain gauge element comprised of a piezoresistive semiconductor material and having two end portions and an intermediate portion, said strain gauge element bridging said transverse groove and having its end portions bonded to respective arm portions on said supporting member, a terminal element provided with a projection, said terminal element being affixed to said body, said supporting member having one of its arm portions affixed to said inertia member and the other of its arm portions positioned against the projection of said terminal element, and a spring force means for providing a holding force for holding said other arm portion of said supporting member against said projection only when the acceleration to which the accelerometer is subjected lies within a normal range, whereby when the acceleration force on said inertia member is within said normal acceleration range said one arm portion having its end affixed to said inertia member is rotated about said groove relative to said other arm portion which is being held by the spring force means against said projection to thereby transmit a strain corresponding to the acceleration force across said strain gauge element, and whereby when the acceleration force on said inertia member is in excess of said normal acceleration range, said spring force means is overcome and said other arm portion is tilted relative to said projection to thereby enable both said arm portions to rotate together about said transverse groove to lift said other arm portion from part of said projection to prevent overload of said strain gauge element when such excess acceleration force occurs.

24. In an electromechanical transducer for producing an electrical signal in response to a mechanical force:

an elongated electrosensitive element responsive to bending moments about a midsection, said element being characterized by a normal operating range of bending moments and a higher bending moment at which damage occurs;

a mounting structure for the electrosensitive element at one side of the midsection, said mounting structure comprising a pair of spaced apart pivot means engaging part of said electrosensitive element on that side and spring means urging said part into engagement with said pivot means;

means for applying the force to the part of said electrosensitive element on the other side of said midsection to produce bending moments about said midsection, the spring force being such that for applied forces producing bending moments in the normal operating range the electrosensitive element is held in contact with said pivot means and such that when the applied force exceeds the normal range but is below that which produces a damaging bending moment the electrosensitive element is lifted free of one pivot means and rotates about the other pivot means; and means connected to said electrosensitive element for detecting changes in the electrical properties thereof produced by such bending moments in the normal operating range.

25. An electromechanical transducer as defined in claim 24 comprising means including mechanical stops limiting gross overtravel of the parts of the transducer.

26. In an electromechanical transducer for producing an electrical signal in response to a mechanical force:

an elongated electrosensitive element responsive to bending moments about a midsection, said electrosensitive element comprising an elongated supporting member having a transverse groove on one side thereof midway between the ends thereof to form a Cardan hinge at said midsection and to form two support arms on opposite sides of said midsection, a piezoresistive semiconductor strain gauge element having two end portions secured to said support arms on opposite sides of said groove and having an intermediate portion, said electrosensitive element being characterized by a normal operating range of bending moments which cause the resistance of said strain gauge element to vary in a manner corresponding to variations in bending moment in said range and a higher bending moment at which damage to said strain gauge element occurs;

a mounting structure for the electrosensitive element at one side of the midsection, said mounting structure comprising two pivot means engaging the support arm on that side and spring means urging said support arm into engagement with said pivot means;

means for applying the force to the other support arm to produce bending moments about said midsection, the spring force chosen being such that for applied forces producing bending moments in the normal operating range the spring-urged support arm is held in contact with both said pivot means and such that when the applied force produces a bending moment outside the normal range but below that which produces a damaging bending moment, the electrosensitive element is lifted free of one pivot means and rotates about the other pivot means; and means connected to said strain gauge element for detecting changes in the electrical resistance thereof produced by such bending moments in the normal operating range.

27. An electromechanical transducer as defined in claim 26 wherein said intermediate portion of said semiconductor strain gauge element has a reduced cross-section compared with said end portions.

* * * * *